United States Patent

Brock

[11] Patent Number: 5,901,999
[45] Date of Patent: May 11, 1999

[54] DEVICE FOR CARRYING OR DRAGGING AN ANIMAL

[76] Inventor: Kenneth Brock, 1299 South 90 West, Albion, Ind.

[21] Appl. No.: 08/929,814

[22] Filed: Sep. 15, 1997

[51] Int. Cl.⁶ .............................. A01M 31/00; B65G 7/12
[52] U.S. Cl. .......................... 294/153; 294/137; 294/150
[58] Field of Search ................... 294/1.1, 15, 26, 294/74, 82.11, 82.12, 82.14, 137, 141–143, 149, 150, 153–156, 159, 162, 164, 165, 170; 224/103, 921; 452/185, 187, 189, 192

[56] References Cited

U.S. PATENT DOCUMENTS

| | | |
|---|---|---|
| 486,649 | 11/1892 | Verhaven . |
| 1,335,888 | 4/1920 | Fulton ..................................... 294/153 |
| 2,457,858 | 1/1949 | Alexander . |
| 2,931,629 | 4/1960 | Keller .................................. 294/149 X |
| 3,188,130 | 6/1965 | Pietrowicz ................................ 294/74 |
| 3,404,819 | 10/1968 | Rolph . |
| 3,578,226 | 5/1971 | Good ....................................... 294/137 |
| 4,153,189 | 5/1979 | Hughes ............................... 294/156 X |
| 4,243,164 | 1/1981 | Burlison et al. . |
| 4,529,240 | 7/1985 | Engel ..................................... 294/141 |
| 4,818,121 | 4/1989 | Volk . |
| 5,181,757 | 1/1993 | Montoya ................................. 294/159 |
| 5,316,356 | 5/1994 | Nutting .................................. 294/118 |
| 5,382,064 | 1/1995 | Blais ......................................... 294/26 |
| 5,697,660 | 12/1997 | Smetz .................................. 294/159 X |

FOREIGN PATENT DOCUMENTS 7705625  11/1978  Netherlands ........................... 294/150

*Primary Examiner*—Johnny D. Cherry
*Attorney, Agent, or Firm*—Baker & Daniels

[57] ABSTRACT

A device for carrying or dragging various objects, such as animals, has a triangular-shaped handle with an eye formed proximate the object for receiving a rope to be connected to the object. The load associated with the object is concentrated at the eye of the handle.

18 Claims, 2 Drawing Sheets

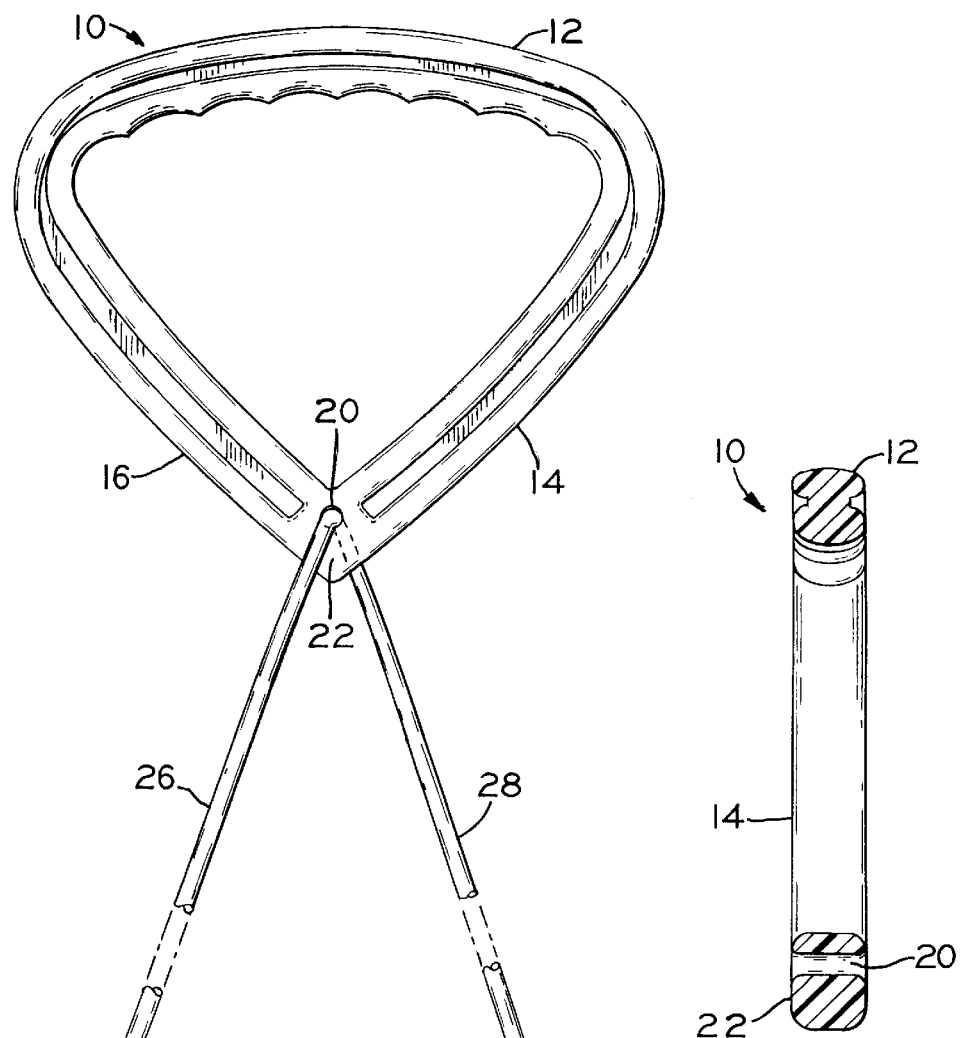
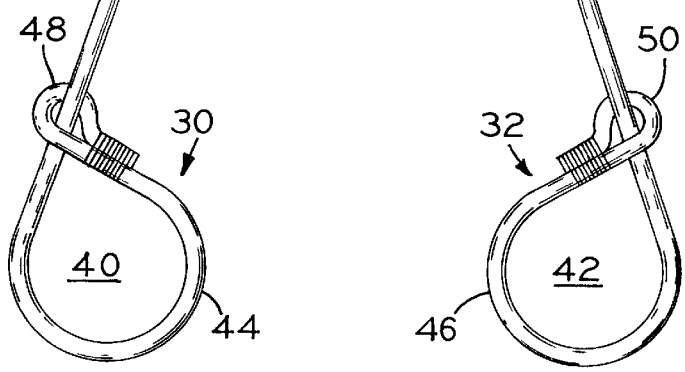
FIG_4
FIG_5

10

DEVICE FOR CARRYING OR DRAGGING AN ANIMAL

BACKGROUND OF THE INVENTION

The present invention relates to devices which aid in the carrying or dragging of various objects, such as deer, elk, moose, etc., from one point to another.

In particular, hunters have been confronted with the problem of moving a slain animal, especially large animals, from a hunting ground to a place for ultimate transport or dressing. This is particularly true where hunting is conducted in isolated areas or in areas characterized by terrain which is difficult to traverse. Prior art game dragging devices are known that have various deficiencies.

For instance, the game dragging device disclosed in U.S. Pat. No. 4,243,164 (Burlison, et al.) discloses a handle which is directly connected to the appendages, such as legs and neck, of an animal to be dragged. The person moving the animal would have to be very close in proximity to the animal which would tend to make walking difficult and dragging the animal unmanageable, especially along rough terrain. Further, with the neck also supported by the handle, the animal's head would have to be raised at least above ground level to prevent the head from becoming ensnarled in bushes, vines, logs, etc. This would be especially true for animals such as deer, elk, and moose that have antlers which extend from the head. It would also be difficult for two people to jointly move a slain animal given the arrangement of the handle disclosed in the Burlison patent.

U.S. Pat. No. 4,529,240 (Engle) discloses a device for carrying and skinning animals which employs two essentially separate handle, rope, and loop combinations which are connected to an animal to be moved. One problem with this device is that the load of the animal would be applied separately and unevenly to the two lengths of rope, especially when two people pull respectively on the two handles. The handles disclosed are not rigged and if the handles were combined to overlap one another, it would be unmanageable for two individuals to jointly carry or drag a slain animal.

SUMMARY OF THE INVENTION

The present invention provides a device for carrying or dragging an object which comprises a triangular-shaped handle having an eye for receiving a length of rope or cable therethrough. The eye is located at a point where two of the legs of the triangular handle come together. That point or junction is proximate the object to be moved. Opposite the eye and along a base leg of the triangular handle is a grip segment where a person or persons carrying or dragging the slain animal grasp the handle and pull. A rope or cable extends through the eye in the handle so as to form two separate sub-lengths of rope or cable and a slip knot or other connecting means is provided at each respective end. The two independent sub-lengths are automatically adjusted through the eye of the handle once connected to an object to be dragged.

The load of the object being dragged is concentrated at the eye of the handle thereby providing more stable handling and movement of the object. In fact, the gripping base of the handle is long enough to accommodate two ends whereby two people may collectively provide the pulling force more evenly. The slip knots or other connecting means are adjustable to a wide variety of configurations to accommodate a large number of objects to be carried. The knots or connecting means also serve as a catch at the eye of the handle so that the length of rope or cable may extend to a maximum length when connection at only one point of an object to be dragged is required. The simplicity of the design permits the handle to be made from a variety of materials, e.g. wood, plastic, etc., and formed in a one piece body.

By concentrating the load of the object at one focal point on the handle, when pulled, the two sub-lengths of flexible rope or cable come together and draw the respective appendages of the object being dragged together. This facilitates dragging and helps prevent the object from becoming ensnarled as it is dragged along the ground.

In one embodiment, the invention provides a generally triangular-shaped handle for carrying or dragging an object. The handle comprises a base leg which extends generally perpendicular to the object and which is distal from the object. First and second extending legs are provided which respectively extend from opposite ends of the base leg and which converge at a joint which is proximate to the object. An eye is formed in the handle at the joint and receives a flexible length of cable for attaching to the object to be carried or dragged.

In another embodiment, the invention provides a device for carrying or dragging an object. The device comprises a generally triangular-shaped handle having a base leg and first and second extending legs. The base leg extends generally perpendicular to and distal from the object. The first and second extending legs extend from opposite ends of the base leg and converge at a joint which is proximate to the object. An eye is formed in the handle at the joint. A length of flexible cable or rope extends through the eye to form first and second sub-lengths of cable which extend from the eye to the object to be carried or dragged. A means for connecting the length of cable to the animal is provided at either end of the length of cable.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 4. is a detailed illustration of the slip knot arrangement for use with the cable of FIG. 2.

FIG. 5 is a sectional view of the handle of FIG. 1 taken along 5—5.

Figure 1:
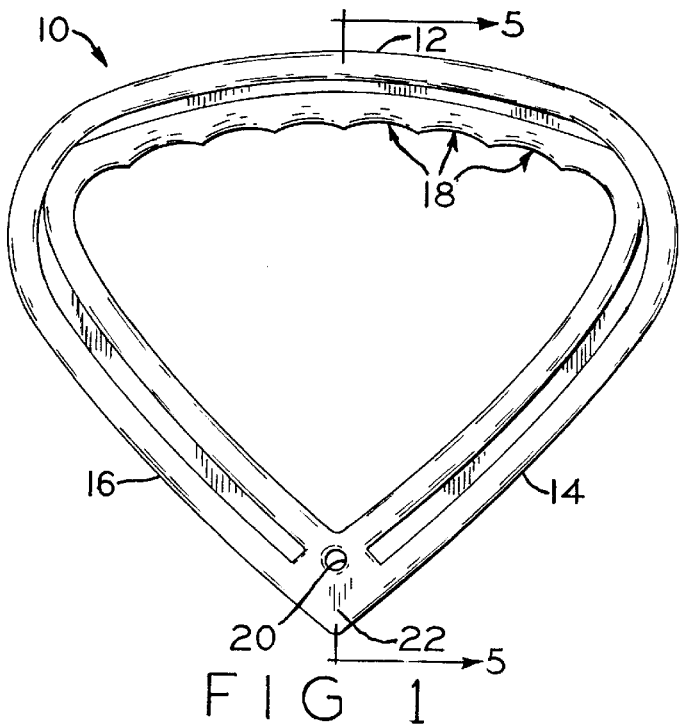
FIG. 1 is a front view of the handle of the present invention.

Corresponding reference characters indicate corresponding parts throughout the several views. The exemplication set out herein illustrative preferred embodiment of the invention, in one form thereof, and such exemplications are not to be construed as limiting the scope of the invention in any manner.

DETAILED DESCRIPTION OF THE INVENTION

Referring now to the drawings and particularly to FIG. 1, handle 10 of the present invention is shown being generally triangular in shape. Handle 10 is provided with base leg 12 and extending legs 14 and 16. Base leg 12 may be slightly curved and includes gripped surface 18 to facilitate gripping of the handle. In the preferred embodiment, base leg 12 is long enough to permit two hands to grip the handle. Legs 14 and 16 extend respectively from the ends of base leg 12 and converge at joint 22. In this manner, the handle takes on a triangular-shape; in fact, it preferably generally forms an equilateral triangle with each respective angle between the base and extending legs being approximately 120 degrees.

Receiving eye 20 is provided in handle 10 at joint 22 and has a generally circular cross-section which is sized large enough to receive a rope, cable, or the like, of sufficient strength to permit a large object, such as a deer, elk, or moose, to be moved by an individual, or individuals, who is exerting a pulling force on handle 10. Among other things, the rope or cable may be made of nylon, cotton, or any other suitable material.

In the preferred embodiment, handle 10 is made of one-piece construction and formed of plastic or hard rubber. The handle is characterized by an inner portion and an outer portion which are somewhat raised and rounded and which surround an intermediate portion. The intermediate portion is generally flat from inner to outer portions. The eye may be formed in the inner portion or in the intermediate portion.

Figure 2:
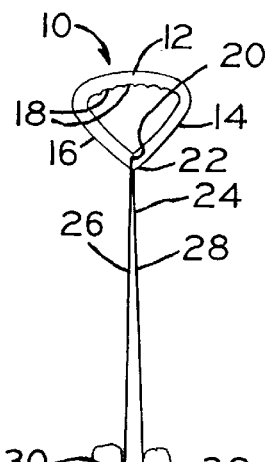
FIG. 2 is a front view of the handle and cable combination of the present invention illustrated connected to an animal to be dragged or carried.

As shown in FIG. 2, rope or cable 24 is threaded through eye 20 so as to form two separate sub-lengths 26 and 28 which extend respectively from eye 20 and terminate respectively into slip knots 30 and 32. A more detailed illustration of one particular embodiment of slip knots 30 and 32 is provided in FIG. 4. This is by way of example only; other suitable means for attaching cable 24 to an animal to be moved is fully contemplated by the present invention. Slip knots 30 and 32 are respectively attached to legs 34 and 36 of animal 38. The slip knots tighten as the pulling force increases at sub-lengths 26 and 28. As handle 10 is pulled in a direction away from object 38, slip knots 30 and 32 respectively tighten about legs 34 and 36 and legs 34 and 36, as well as sub-lengths 26 and 28, are drawn together while the object is being moved. By having legs 34 and 36 closely drawn together, the likelihood of animal 38 becoming entangled in tree limbs, brush, etc. is significantly lessened.

As the animal 38 is moved from one location to another, the entire load of object 38 is applied upon handle 10 at joint 22. By having the load concentrated at this one point the device of the present invention facilitates handling by one or more individuals. Handle 10 may be made from a variety of materials, such as wood, plastic, etc., and may be formed in a one piece body. Rope or cable 24 may be made of any suitable material having sufficient strength to effect the movement of a large animal or object. If one slip knot, such as 30, is not attached to an animal, and the other slip knot, 32, is attached to an animal, then sub-length 26 decreases to a minimum and sub-length 28 increases to a maximum.

Figure 3:
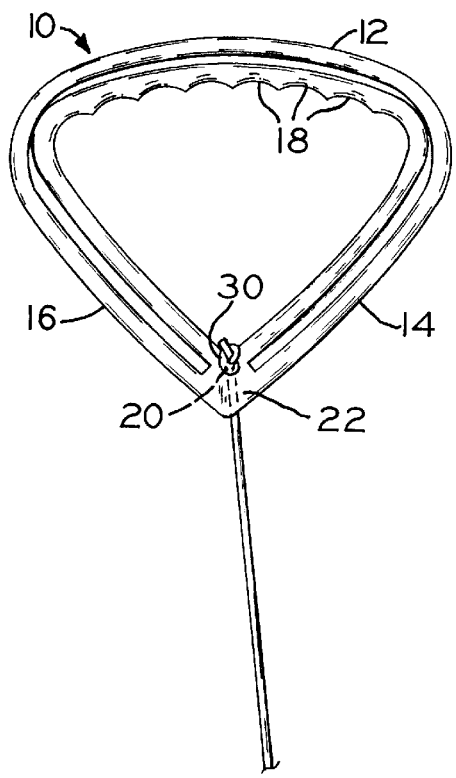
FIG. 3 illustrates the handle and cable combination of FIG. 2 in a fully extended condition with one end of the cable adjacent the eye in the handle.

As shown in FIG. 3, slip knot 30 acts as a catch at eye 20 to prevent separation of rope 24 from handle 10. In this manner, the distance between the person pulling handle 10 and the object 38 is increased to a maximum. In this position, sub-lengths 26 and 28 are essentially combined to form one length which is effectively as long as rope 24. Slip knot 30 engages handle 10 about eye 20 and is configured to be large enough so as to prevent rope 24 from becoming separated from handle 10.

FIG. 4 illustrates one embodiment of slip knots 30 and 32 in which knot eyes 40 and 42 are formed by tying or otherwise attaching the respective ends of sub-lengths 26 and 28 to an intermediate section of sub-lengths 26 and 28 so as to form loops 44 and 46. To make slips knots 30 and 32 adjustable for receiving animal appendages of different shapes and sizes, connection joints 48 and 50 are configured to slidingly engage along sub-lengths 26 and 28. With no appendages received in eyes 40 and 42, and no tensile load applied along sub-lengths 26 and 28, connection joints 48 and 50 may be freely moved along sub-lengths 26 and 28 to enlarge or decrease the openings by eyes 40 and 42 as desired. With slip knots 30 and 32 placed about appendages 34 and 36, by introducing such appendages through eyes 40 and 42, connection joints 48 and 50 may be moved respectively along sub-lengths 26 and 28, gradually shrinking eyes 40 and 42 until slip knots 30 and 32 fit snugly about appendages 34 and 36. By applying a pulling force at handle 10, and accordingly along sub-lengths 26 and 28, slip knots 30 and 32 are further tightened about appendages 34 and 36 and thereby the dragging device is securely attached to animal 38. Connection joints 48 and 50 may be formed in any one or a combination of known methods such as interwoven knots, grommets, metallic eyes, etc. In particular, the connection may be formed by gluing the ends to intermediate sections, using a wrap, string, metallic binding, etc. Further, in the case of a unibody type cable, such as a bungy cord made of rubber, connecting joints 48 and 50 may be directly formed in the cable/cord.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to whom this invention pertains and which fall within the limits of the appended claims.

What is claimed is:

1. A generally triangular-shaped handle for carrying or dragging an animal, said handle made of a one-piece plastic construction, said handle comprising:

a base leg having a length sufficient to allow two human hands to grasp said base leg along substantially the width of the two human hands;

first and second legs extending respectively from opposite ends of said base leg and converging at a joint, said base leg, first leg, and second leg forming a generally equilateral triangle; and an eye formed in said handle at said joint, said eye capable of receiving a flexible length of cable so that one or two humans may attach the cable to the animal to be carried or dragged and use said handle to pull the cable and thereby carry or drag the animal.

2. The handle of claim 1 wherein said base leg includes a series of slight curves along a peripheral interior surface adapted to allow gripping by two human hands.

3. The handle of claim 1 wherein said eye is formed as a through aperture at said joint.

4. The handle of claim 3 wherein said eye is sized to prevent the passage of a knot formed in the cable.

5. The handle of claim 1 wherein said base leg, said first leg, and said second leg each include raised and rounded inner and outer portions connected by a flat intermediate portion.

6. The handle of claim 1 wherein said base leg and said first and second legs are arranged so that substantially all of the load of a deer, elk, or moose is supported by said joint via said eye.

7. A device for carrying or dragging an animal, said device comprising:

a generally triangular-shaped handle made of a one-piece plastic construction, said handle having a base leg and first and second legs, said base leg having a length sufficient to allow two human hands to grasp said base leg along substantially the width of the two human hands, said first and second legs extending respectively from opposite ends of said base leg and converging at a joint, said base leg, first leg, and second leg forming a generally equilateral triangle;

an eye formed in said handle at said joint; and a length of cable made from flexible material and extending through said eye to form first and second sublengths of cable which extend from said eye to said animal, said length of cable being capable of attachment to the animal so that one or two humans may attach said cable to the animal to be carried or dragged and use said handle to pull said cable and thereby carry or drag the animal.

8. The device of claim 7 wherein said base leg includes a series of slight curves along a peripheral interior surface adapted to allow gripping by two human hands.

9. The device of claim 7 wherein said eye is formed as a through aperture at said joint.

10. The device of claim 9 wherein said eye is sized to prevent the passage of a knot formed in said cable.

11. The device of claim 7 wherein said base leg, said first leg, and said second leg each include raised and rounded inner and outer portions connected by a flat intermediate portion.

12. The device of claim 7, wherein said base leg and said first and second legs are arranged so that substantially all of the load of a deer, elk, or moose is supported by said joint via said eye.

13. A method of carrying an animal carcass comprising the steps of:

securing a deer carcass to a flexible length of cable;

providing a generally triangular-shaped handle made of a one-piece plastic construction comprising:

a base leg having a length sufficient to allow two human hands to grasp the base leg along substantially the width of the two human hands;

first and second legs extending respectively from opposite ends of said base leg and converging at a joint, the base leg, first leg, and second leg forming a generally equilateral triangle;

an eye formed in said handle at the joint;

attaching the flexible length of cable to the handle through the eye; and one or two humans grasping the handle to pull the cable and thereby carry or drag the deer carcass.

14. The method of claim 13, wherein the base leg includes a series of slight curves along a peripheral interior surface adapted to allow gripping by two human hands.

15. The method of claim 13 wherein the eye is formed as a through aperture at the joint.

16. The method of claim 15 wherein said attaching step includes creating a formed, adjustable knot in the length of cable which is larger than the eye.

17. The method of claim 13 wherein the base leg, first leg, and second leg each include raised and rounded inner and outer portions connected by a flat intermediate portion.

18. The method of claim 13 wherein said base leg and said first and second legs are arranged so that substantially all of the load of the deer is supported by the joint via the eye.

* * * * *